United States Patent
Palmer

(10) Patent No.: US 10,250,336 B1
(45) Date of Patent: Apr. 2, 2019

(54) OPTICAL IDENTIFICATION BEACON

(71) Applicant: Triad National Security, LLC, Los Alamos, NM (US)

(72) Inventor: David Palmer, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 15/232,857

(22) Filed: Aug. 10, 2016

Related U.S. Application Data

(60) Provisional application No. 62/218,232, filed on Sep. 14, 2015.

(51) Int. Cl.
| | |
|---|---|
| *H04B 10/11* | (2013.01) |
| *H04B 10/85* | (2013.01) |
| *G02B 5/02* | (2006.01) |
| *G02B 27/14* | (2006.01) |
| *H04B 10/118* | (2013.01) |

(52) U.S. Cl.
CPC .............. *H04B 10/85* (2013.01); *G02B 5/02* (2013.01); *G02B 27/141* (2013.01); *H04B 10/118* (2013.01)

(58) Field of Classification Search
None
See application file for complete search history.

(56) References Cited

U.S. PATENT DOCUMENTS

| | | | | |
|---|---|---|---|---|
| 5,440,559 A * | 8/1995 | Gaskill | .................. | G08B 5/228 340/10.2 |
| 6,384,948 B1 * | 5/2002 | Williams | ............. | H04B 10/673 398/202 |
| 7,925,167 B1 * | 4/2011 | Kozubal | ............ | H04B 7/18513 398/118 |
| 9,122,602 B1 * | 9/2015 | Jewell | ................... | G06F 11/079 |
| 2005/0192719 A1 * | 9/2005 | Sheikh | ..................... | B64G 1/36 701/13 |
| 2008/0008471 A1 * | 1/2008 | Dress | ...................... | G06E 3/006 398/66 |
| 2009/0324236 A1 * | 12/2009 | Wu | ...................... | H04B 10/118 398/122 |
| 2011/0261354 A1 * | 10/2011 | Sinfield | .................... | G01J 3/02 356/301 |
| 2012/0147358 A1 * | 6/2012 | Gardner, Jr. | .............. | G01J 3/02 356/72 |
| 2014/0086590 A1 * | 3/2014 | Ganick | .................. | G06Q 30/02 398/118 |
| 2015/0104183 A1 * | 4/2015 | Jeffrey | .................... | G09C 5/00 398/130 |

\* cited by examiner

*Primary Examiner* — Kenneth N Vanderpuye
*Assistant Examiner* — David W Lambert
(74) *Attorney, Agent, or Firm* — LeonardPatel PC; Michael Aristo Leonard, II; Sheetal Suresh Patel

(57) ABSTRACT

A laser beacon may be attached to a vehicle, object, or personnel, or be incorporated into an existing vehicle optical emitter via software and/or hardware, that allows the vehicle, non-vehicle object, or associated personnel to be uniquely identified using a small telescope with a high-speed photodetector. The telescope may be an amateur telescope with a high speed-photodetector, which significantly reduces cost over more complex optical telescopes. Beacons may also be attached to objects that become space debris, such as fuel tanks, rocket stages, cubesat dispensers, and the like. The beacon may be suitable for use in space, in the air, on water, or on land.

19 Claims, 10 Drawing Sheets

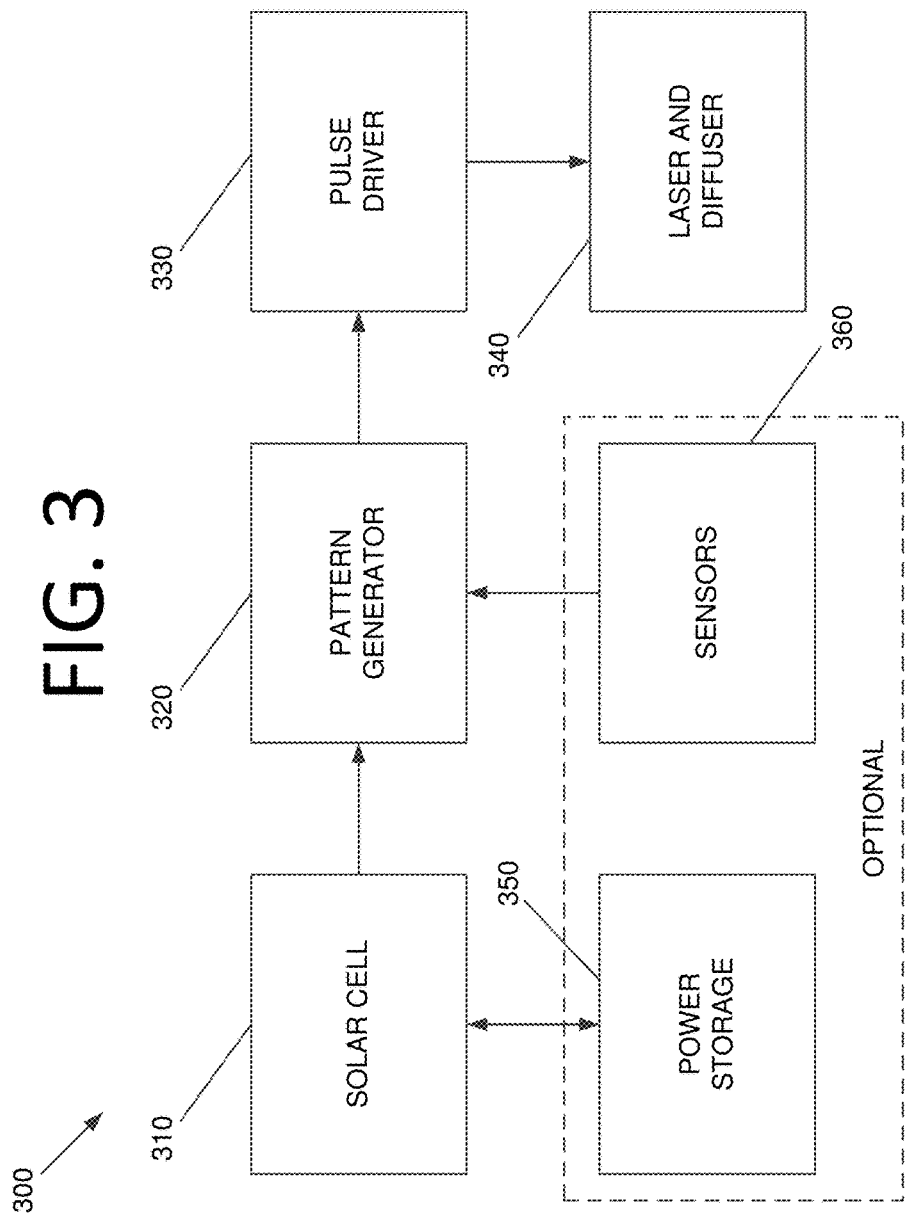

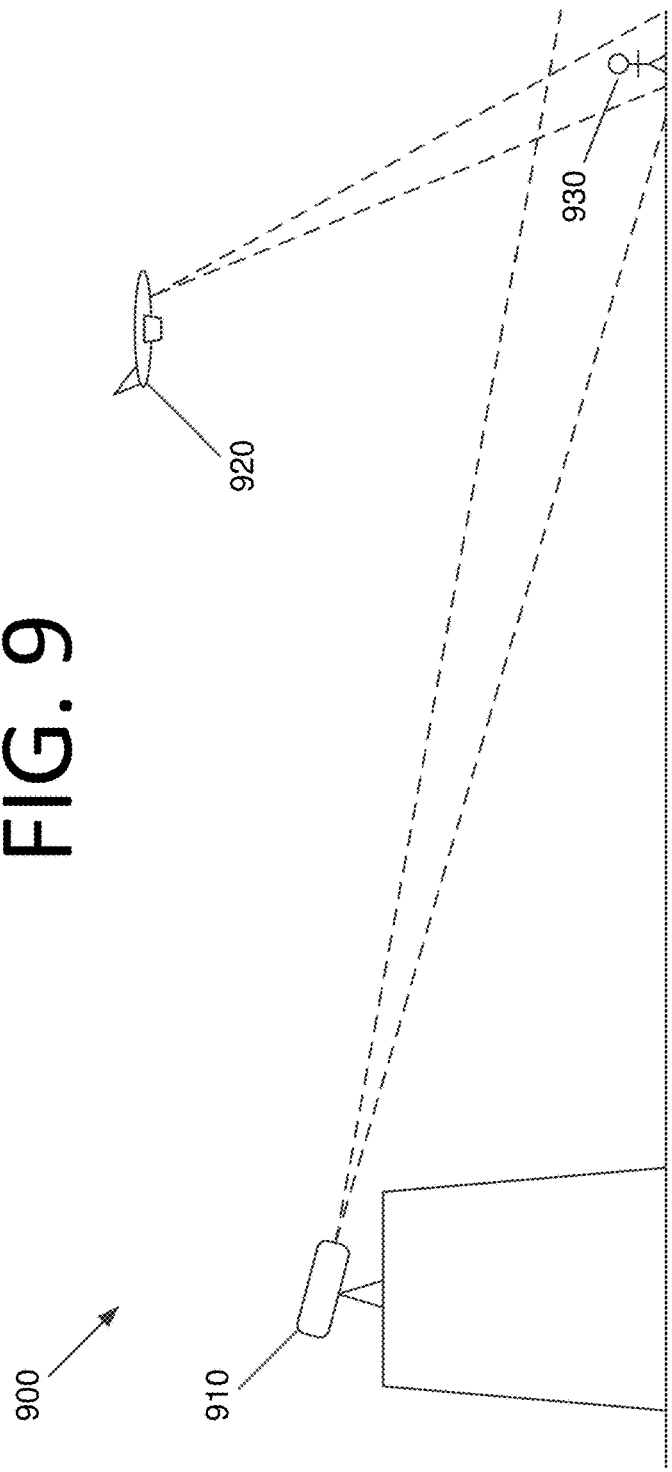

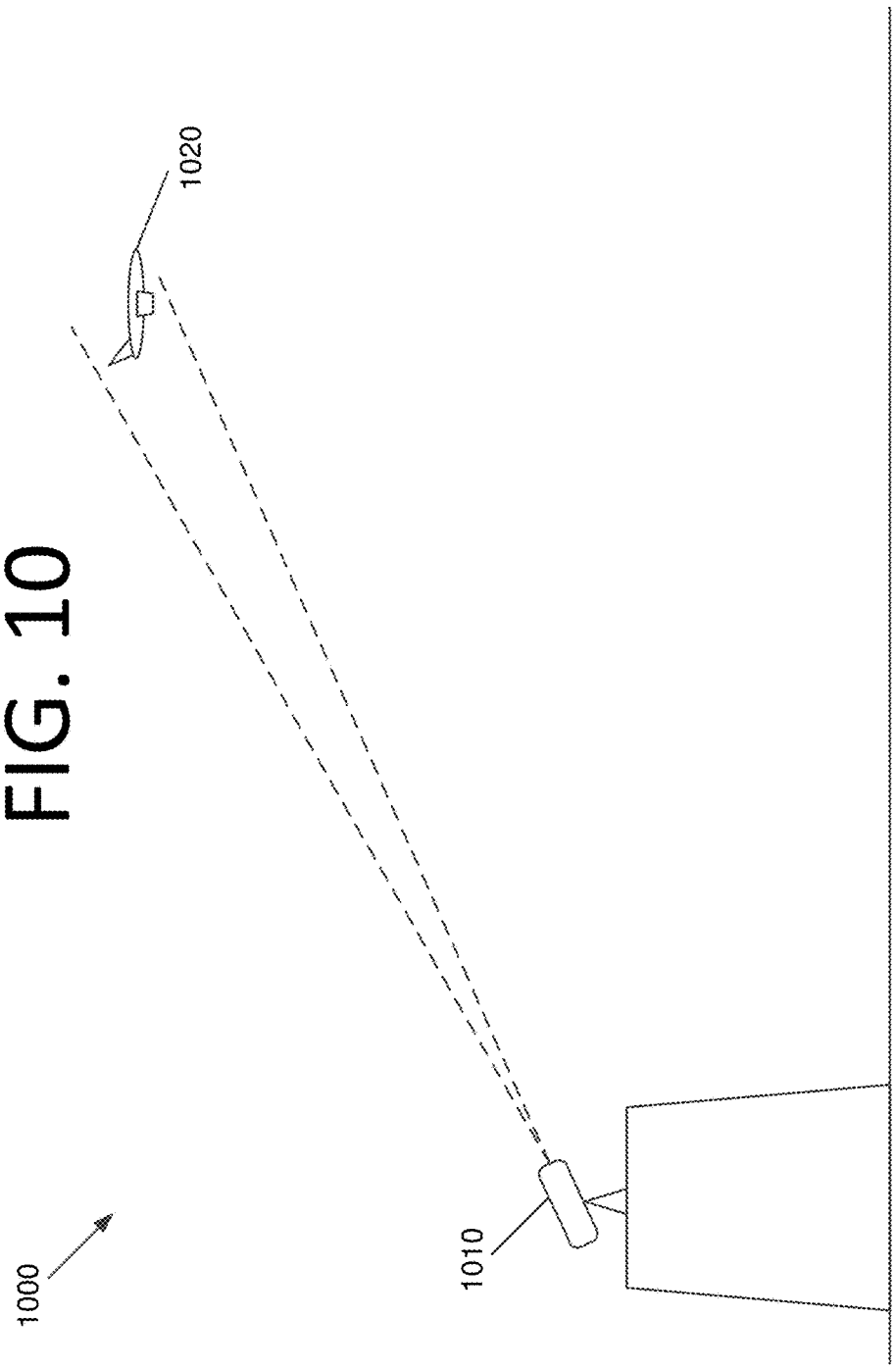

OPTICAL IDENTIFICATION BEACON

CROSS REFERENCE TO RELATED APPLICATION

This application claims the benefit of U.S. Provisional Patent Application No. 62/218,232 filed Sep. 14, 2015. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to object identification, and more specifically, to a laser beacon that attaches to a vehicle, object, or personnel, or is incorporated into an existing vehicle optical emitter via software and/or hardware, and allows the vehicle, non-vehicle object, or associated personnel to be uniquely identified.

BACKGROUND

Currently, to identify a Resident Space Object (RSO) (e.g., an operational satellite, an expended rocket body, or other space debris) as a specific known object, either the active participation of the satellite is required (e.g., via a radio transponder) or observations are compared against the previously known orbits of known RSOs. A space launch, even if completely successful, also usually results in multiple non-space vehicle objects in orbit, often with several items in quite similar orbits. The last stage of a rocket often gently releases one or more payloads and then may do little or nothing to actively separate from the payloads. As a result, a tight grouping of active satellites and expended rocket bodies, fuel tanks, and other debris are often created that should be distinguished during the first few orbits after launch. Some sets of satellites, even from different launches, are also specifically designed to operate together in a close constellation or to share the same orbital slot. Choosing the "wrong dot of light" to send radio commands to can imperil the mission.

Optical telescopes and radar systems can show the positions of multiple objects, but they do not necessarily determine which object is which. Objects in Low Earth Orbit (LEO), for example, can be observed for only a short time from any given ground station, and it may not be possible to match items even from one observation to the next. The optical characteristics (e.g., color, brightness, variability, etc.) may provide some information, but this is not always sufficient for identification.

Even after an RSO is properly identified, it must be frequently and continually re-observed to maintain track custody. An orbital maneuver must also be carefully observed to avoid losing track of the space vehicle. A major atmospheric disturbance, e.g., from a solar flare, can cause simultaneous perturbations to the orbits of many space vehicles, and it is not unusual for many space vehicle tracks to be lost or confused either temporarily or permanently. If an unknown RSO is detected, it is often impossible to tie it back to a previously known object, and without such knowledge, it is more difficult to predict its future orbit, leading to the possibility that the object will be lost again. Thus, once a space object is identified, it is necessary to make repeated measurements of every known object at a high enough frequency such that as the orbit changes, a new observation can be tied to the previously known object.

Known objects that are tracked can have their orbits predicted, allowing other operational space vehicles to dodge and avoid devastating collisions, or at least ascribe liability if they do collide. Tracked unknown objects can be less reliably predicted, and untracked objects can smash into valuable space assets without warning. For these reasons, it would be useful if every object that launched into space carried a beacon that can be read from the ground with low cost equipment and provide a unique and unambiguous identification even among closely spaced RSOs. This beacon should be small, simple, lightweight, durable, and autonomous so that one or more can be added to each desired component of a space launch without a significant engineering effort and without using up spacecraft resources.

Active satellite payloads often include radio transmitters to transmit data and communications to the ground as part of the space vehicle's primary purpose or for operations. These transmissions may be sufficient to identify a satellite, but if multiple satellites are in the beam of the ground antenna, this does not identify which vehicle is which. An unidentified satellite may be transmitting, but at an unknown frequency. A satellite may also leave its transmitter inactive until it receives a command to turn it on, which cannot be given without knowing which object it is.

Some satellites carry global positioning systems (GPS) or other navigation systems that allow the satellites to know their positions and transmit them to the ground, but most do not. Furthermore, this applies only to satellites that are actively transmitting. When a satellite reaches the end of its useful life, its transmitter is usually permanently disabled to prevent it from malfunctioning in the "ON" state and causing interference with intended communications. Inactive space debris, such as rocket bodies, have no transmitters at all.

If something goes wrong with a satellite, data regarding the event can help to recover the spacecraft. However, it is often the case that the malfunction includes a lack of communication, and all that is known on the ground is that the satellite went silent. Thus being able to receive additional state-of-health information about a satellite would be useful for analyzing spacecraft anomalies and recovery operations.

Effective identification is a terrestrial problem as well. The present state of the art for nighttime personnel identification as friend or foe (IFF) beacons is optically very similar to an infrared strobe light. Commonly available nighttime personnel IFF beacons are visible with night vision goggles. These personnel IFF beacons are intended to be invisible to adversaries, but are not. The night vision systems needed to see these personnel IFF beacons are now quite conventional and available worldwide. Accordingly, improved nighttime personnel IFF beacons may be beneficial. This need for improved nighttime IFF beacons includes those for personnel, objects, vehicles, units, equipment, locations, etc.

SUMMARY

Certain embodiments of the present invention may provide solutions to the problems and needs in the art that have not yet been fully identified, appreciated, or solved by conventional object identification technologies. For example, some embodiments of the present invention pertain to a low resource beacon that uses a broad angle laser to emit a unique laser identifier. In some embodiments, the beacon may be attached to space vehicles, space objects, ground vehicles, ground objects, or any other suitable vehicle or object. In certain embodiments, the beacon may be attached to clothing, worn via a strap, or otherwise worn by or affixed to an individual, such as a soldier deployed on a battlefield. Identification may be performed via an optical telescope, binoculars, or any other suitable optical receiving device with a high-speed photodetector.

In some embodiments, the beacon may be operated in a fashion as to be visible by any observer, e.g., a "space license plate." In other embodiments, the beacon may be operated so as to be observable only by a restricted, controlled, and authorized set of observers, e.g., a private identifier or IFF beacon that is invisible to unauthorized observers. This restricted observability can be achieved by using unpublished sets of wavelengths, encodings, timing schemes, polarization channels, or any combination thereof.

In an embodiment, a system includes a laser beacon. The laser beacon includes a laser configured to emit light and a pattern generator and pulse driver that are configured to control the laser to emit laser light in accordance with a pattern of a beacon signal. The laser beacon also includes a diffuser configured to diffuse the emitted laser light. The system also includes an optical detection system configured to receive the diffused laser light emitted from the laser beacon.

In another embodiment, an apparatus includes a laser configured to emit light and a pattern generator and pulse driver that are configured to control the laser to emit laser light in accordance with a pattern of a beacon signal. The apparatus also includes a diffuser configured to diffuse the emitted laser light.

In yet another embodiment, an optical detection system includes a dichroic mirror in an optical path of an optical telescope configured to pick off light wavelengths in a range that include a wavelength of a laser beacon. The optical detection system also includes a narrow-band filter configured to block light that is more than a predetermined wavelength from the wavelength of the laser beacon and a photon-counting camera configured to determine arrival times of photons in the wavelength of the laser beacon.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 is a block diagram illustrating a laser beacon, according to an embodiment of the present invention.

FIG. 9 is an architectural diagram illustrating a ground beacon system, according to an embodiment of the present invention.

FIG. 10 is an architectural diagram illustrating an air-to-ground beacon system, according to an embodiment of the present invention.

DETAILED DESCRIPTION OF THE EMBODIMENTS

Figure 1:
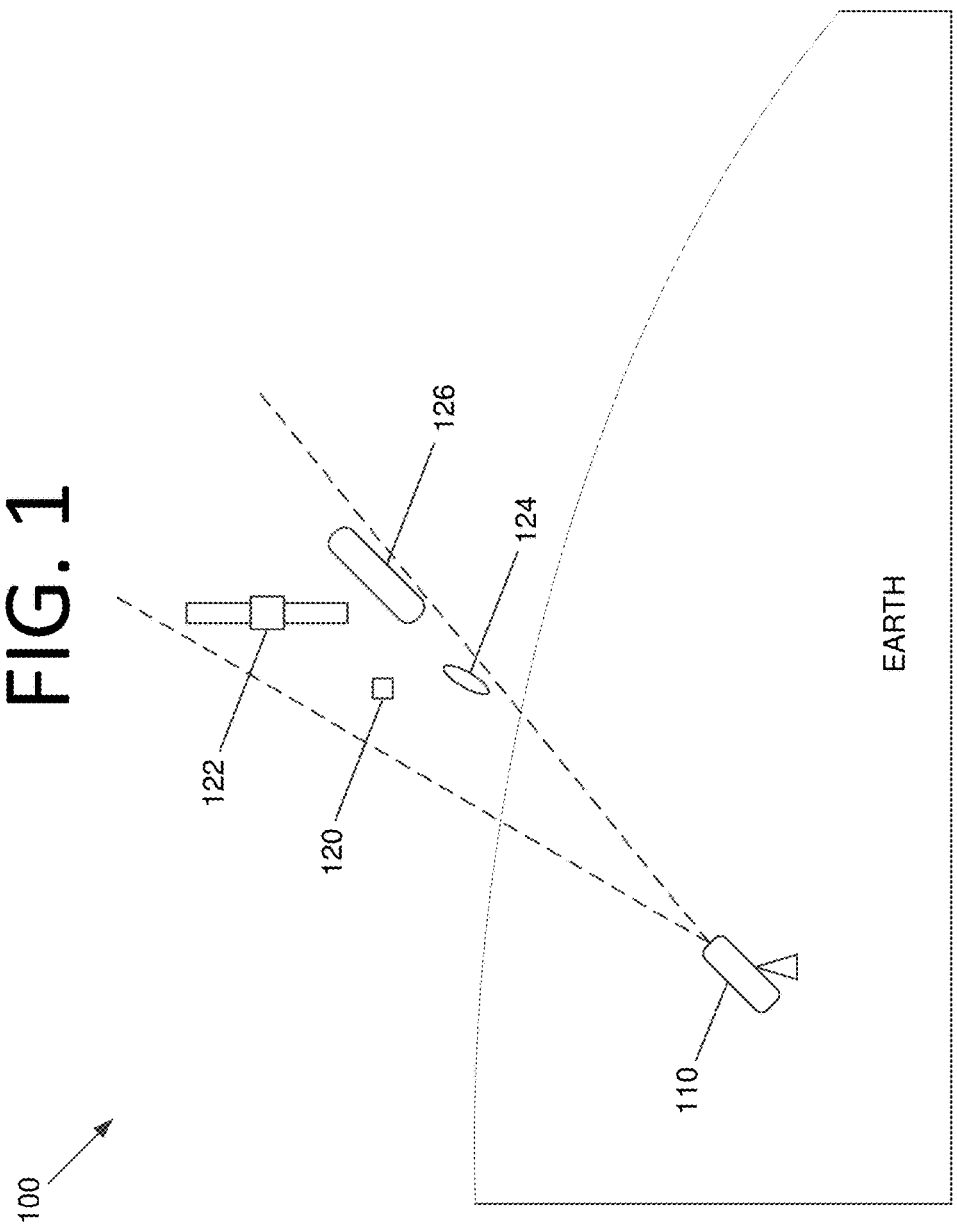
FIG. 1 is an architectural diagram illustrating a space beacon system, according to an embodiment of the present invention.

Some embodiments of the present invention pertain to a beacon device that allows a space vehicle, an inactive space object, a ground vehicle, a ground object, and/or ground personnel to be uniquely identified from the ground using a small telescope, for example, with a high-speed photodetector. In some embodiments, the telescope may be an amateur telescope with a high speed-photodetector, which significantly reduces cost over more complex optical telescopes. Beacons of some embodiments may be attached to objects that become space debris (e.g., fuel tanks, rocket stages, cubesat dispensers, etc.).

A radio beacon system has a number of disadvantages. Radio is power hungry, is prone to interference, can cause interference, and is not very selective. Because of the interference problem, it is not desirable for a separate transmitter to be continuously broadcasting from each RSO for its entire lifetime. To determine which object in a cluster of co-orbiting RSOs is generating a beacon signal can require an antenna with an impractically narrow beamwidth. International regulatory issues are also likely to be challenging.

Accordingly, embodiments utilize an optical beacon that can be detected using the same telescope used to track RSOs, or even using a simpler, amateur-class telescope. Even if multiple RSOs are in the telescope's field of view, the light from each can be independently examined for a beacon signal. If the beacon object is illuminated by sunlight, or if observations are made through the daytime sky, considerable background light will be present. However, this can be mitigated effectively by a combination of a narrow optical bandwidth and a low duty cycle that provides high peak power with low average power.

Embodiments may be functionally analogous to a "license plate" for associated objects. Furthermore, certain embodiments may function as a "black box" for desired objects that include sensors providing various data, such as detecting shocks from debris strikes, electrostatic discharges, changes in the electromagnetic environment indicating power anomalies, etc. This may be particularly beneficial for space vehicles, where it may not be possible to conventionally determine what caused a vehicle to stop transmitting.

Some embodiments of the beacon use a broad angle laser to transmit data. For instance, the angle may be greater than five degrees. One such beacon may be sufficiently broad to reach the entire visible hemisphere of Earth in certain embodiments, which renders pointing moot. Due to space vehicle and object rotation, multiple beacons may be used to ensure that identification is possible in multiple or all orientations. In certain embodiments, the beacon may be implemented in a space vehicle via an existing emitter via software and hardware. Power may be provided by solar panels, batteries, capacitors, or any combination thereof. Such embodiments may provide a very low power communication system that achieves the low power by narrow wavelength bandwidth (e.g. approximately 2-5 nm where the width of the filter is 4-10 nm) and a low duty cycle (e.g., less than 1%) and coding. However, in certain embodiments, such as those for small satellites, adequate performance may be achieved without the use of a narrow filter, and the beacon light emitter may be a Light Emitting Diode (LED) or other suitable light source instead of a laser.

Such embodiments may be advantageous for commercial satellite operators that need to keep track of their satellites. There are multiple companies that are planning to launch constellations of hundreds to thousands of satellites for Internet, communications, imaging, etc. Also, satellite insurers have a vested interest in showing that a space collision did not involve one of their insured objects. They also have an interest in preventing these collisions, which is much easier if the space items are well understood and tracked.

The technique from set up, through emission, detection, and the decoding algorithm in some embodiments relies on innovations in extreme background rejection to separate and detect a very small signal from a large background. Extreme background rejection may involve any, all, or any combination of the approaches disclosed herein. Extreme background rejection may be based on tracking the emitting object, optical wavelength selection, temporal encoding with very short optical pulses, very high time resolution in the detectors, very high time resolution cameras, single-photon detectors, single-photon position-and-timing cameras, encoding schemes with redundant information, encoding schemes over restricted domains, and/or error correction encoding schemes. Each of these general steps (tracking, wavelength, time, code) leads to background rejection of order 99 to 99.9%. In combination, extreme background rejection can be effective at the $10^{-8}$ to $10^{-12}$ level.

Extreme background rejection in some embodiments entails tracking the emitting object and rejecting light (photons) outside of small angular region around that object. Extreme background rejection entails rejecting data (light, photons, sensor noise, etc.) outside of small region on position-sensitive or position-and-time sensitive camera, whether pixelated or not. If pixelated, this corresponds to rejecting data (light, photons, sensor noise, etc.) outside a small group of pixels, where that group of pixels could be stationary or changing with time. Extreme background rejection entails spectrally resolving the light in the observation, e.g., by restricting or splitting. This optical extreme background rejection may include a simple filtering at input, splitting to allow an independent broadband imaging channel simultaneous with a decoding channel, and optical dispersion onto a position sensitive readout.

Timing extreme background rejection may entail confining the signal photons to low duty cycle pulses in a regular, known, predictable, or discoverable time pattern, allowing the background photons received at times not conforming to that pattern to be rejected. Coding extreme background rejection may entail comparing the photons received to an error detection and correction code, and rejecting symbol values inconsistent with the coding scheme.

FIG. 1 is an architectural diagram illustrating a space beacon system 100, according to an embodiment of the present invention. In this example, space beacon system 100 includes an optical telescope 110, a cubesat 120, a larger satellite 122, a fuel tank 124, and a rocket stage 126. Cubesat 120, larger satellite 122, fuel tank 124, and rocket stage 126 are in the view of optical telescope 110, which is indicated by dashed lines. As is clear to one of ordinary skill in the art, FIG. 1 is not drawn to scale and is for illustrative purposes only.

Each of cubesat 120, larger satellite 122, fuel tank 124, and rocket stage 126 includes a beacon (not shown) that emits a unique optical identifier. In the case of cubesat 120 and larger satellite 122, the optical beacon may be integrated into an existing optical emitter, if included in the respective satellite, via software, hardware, or any combination thereof. Furthermore, in some embodiments, state-of-health information may be provided by the beacons for cubesat 120 and/or larger satellite 122.

Figure 2:
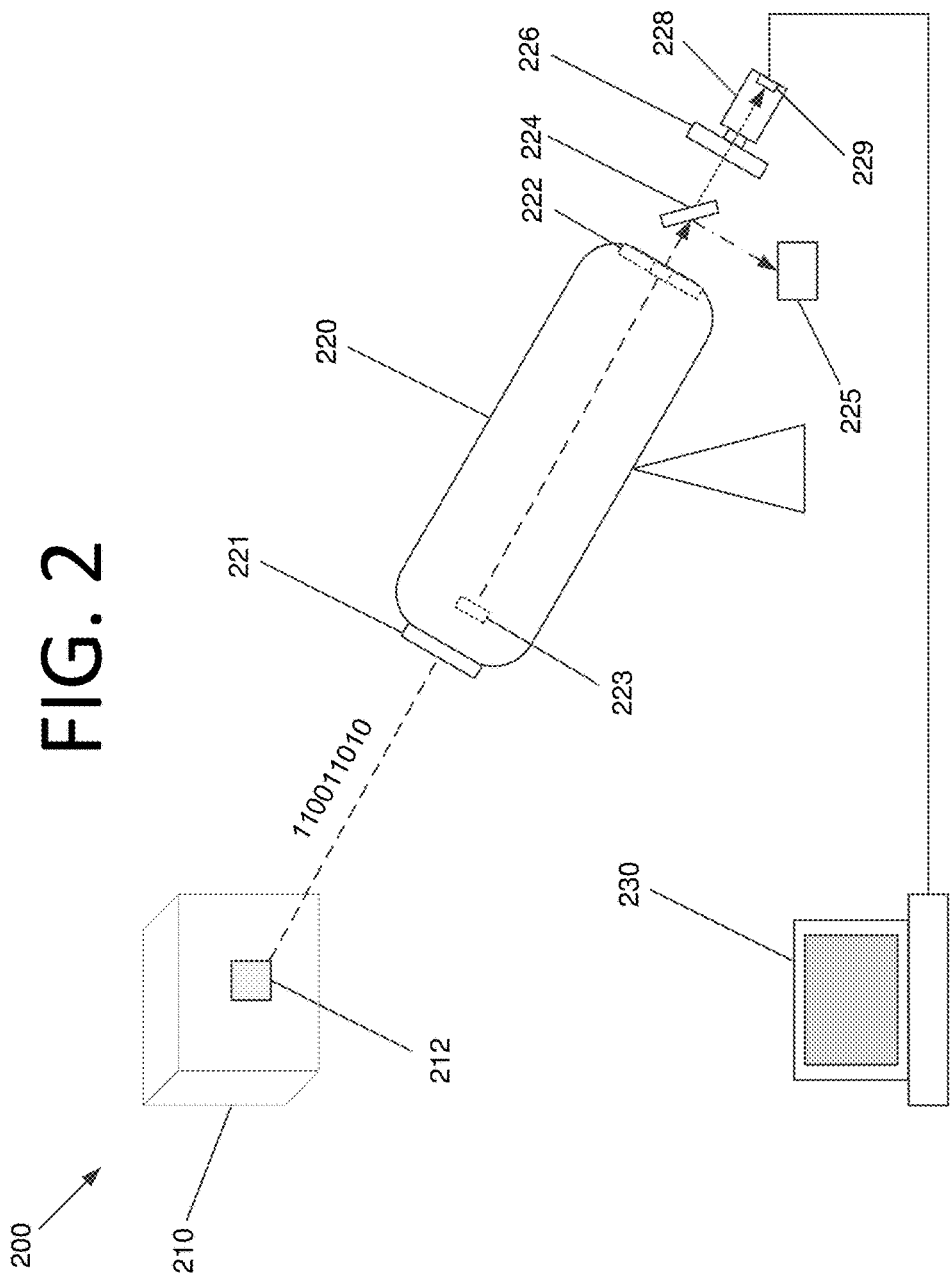
FIG. 2 is an architectural diagram illustrating a space beacon system, according to an embodiment of the present invention.

FIG. 2 is an architectural diagram illustrating a space beacon system 200, according to an embodiment of the present invention. In this embodiment, space beacon system 200 includes a cubesat 210, an optical telescope 220, and a computing system 230. In some embodiments, computing system 230 may be integrated with optical telescope 220.

Cubesat 210 includes a laser beacon 212 that emits a narrow optical bandwidth and has a low duty cycle that provides high intensity pulses of light via a pulsed laser diode or other suitable light source. The light may be diffused so it is visible from all angles where cubesat 210 is in view. In some embodiments, all space beacons use the same wavelength to simplify detection of the beacon on unknown objects. The characteristics of the laser pulses are such that given the timed detection of a few beacon photons among relatively large numbers of non-beacon photons, the beacon photons can be distinguished from the non-beacon photons. In this embodiment, cubesat 210 is identified by the binary identifier 110011010. However, any suitable identifier and identifier length may be used as a matter of design choice. This unique "encoding" distinguishes cubesat 210 from other space vehicles and/or other objects, allowing it to be uniquely identified among other RSOs. Further detail regarding an embodiment of a laser beacon is shown in FIG. 3.

A ground observer tracks cubesat 210 via optical telescope 220. Light, including both the laser light of the beacon and other light, enters optical telescope 220 via a lens 221, is reflected by a primary mirror 222 into a secondary mirror 223, and then is reflected by the secondary mirror through a dichroic mirror 224. The entire optical path is not shown—only the path starting with light reflected by second mirror 223. Also, in some embodiments, different telescope architectures may be used without deviating from the scope of the invention.

Dichroic mirror 224 splits the light into two optical paths. One path that does not include the laser light may be sent to an imaging detector 225 (e.g., a quadrant detector, a single-photon imaging camera, a conventional camera, etc.) that detects sunlight reflected by the satellite and/or light from stars. This may be used as a fine guidance sensor to keep optical telescope 220 accurately pointed at known satellites, RSOs, etc.

The other path includes the laser light from laser beacon 212. In essence, dichroic mirror 224 "picks off" light wavelengths that include the wavelength of laser beacon 212. A narrow-band filter 226 is in this path and blocks light that is not near the wavelength of laser beacon 212. The light that is not blocked by narrow-band filter 226 falls on a laser detector 229 which may be a single-point detector (e.g., an avalanche photodiode, a photomultiplier tube, etc.) or a photon-counting camera 228, which in either case, provides accurate timing of the detected photons. In certain embodiments, different areas of the same detector are used for both beacon signal detection and fine guidance.

In some embodiments, an infrared beam containing the laser light (an infrared laser in that case) goes to laser detector 229 (here, a single photodetector) that gets light from only one point in the field of view. The visible beam goes to imaging detector 225 and guides telescope 220 to put the RSO at the pixel that corresponds to where laser detector 229 is in the other beam. Whether dichroic mirror 224 passes the laser light and reflects the non-laser light, or vice-versa, is implementation-specific, and both variations are envisioned without deviating from the scope of the present invention.

For the case with a photon-counting camera instead of a single photodetector, dichroic mirror 224 and imaging detector 225 are unnecessary. In such a case, telescope guidance can be controlled with the data from the photon-counting camera. Furthermore, the guidance merely has to keep the RSO in the camera field of view, instead of precisely centered on the point photodetector. In the data analysis, the full field of view (FOV) of the camera can be imaged to distinguish the photons from the RSO from those of other parts of the FOV, and the RSO photons may be separated out to be analyzed as if they came from a single-point detector. If there are multiple RSOs in the camera FOV, each may be analyzed separately in some embodiments.

In this embodiment, dichroic mirror 224, narrow-band filter 226, and photon counting camera 228 are shown as separate from optical telescope 220, which requires no modification to optical telescope 220 and reduces cost. However, in some embodiments, some or all of these components may be included within optical telescope 220.

The combination of the narrow field-of-view (FOV) of single-photon detector 229 and the narrow bandwidth of narrow-band filter 226 yields a manageable number of precisely-timed photon detections. In some embodiments, a computing system 230 operably connected to photon-counting camera 228 processes (x, y) coordinates to get an image of one or more space objects, and produces the manageable number of photon timing records corresponding to each object. From these photon timing records, and given the standard characteristics of the beacons in some embodiments, subsets of photons consistent with emissions from laser beacon 212 can be extracted, then used to identify cubesat 210. However, in some embodiments, computing system 230 may be integrated with any other ground system components shown herein.

In choosing an identifier beacon scheme, the scheme should be scalable. For instance, one may start with approximately one million numbers, but leave room for more as space becomes more congested. The beacon should be reliable such that it lasts until the object de-orbits, long past the operational life of the payload. Because batteries tend to have limited lifetimes, in some embodiments, the laser beacon is designed to operate whenever the solar panel is illuminated, even if the battery fails. Extreme reliability may not be required since the beacon is generally not mission critical. However, useful redundancy may be provided by placing multiple beacons on the object. For instance, if two beacons are placed on opposite sides of the object, the laser should always be visible as the object tumbles. Furthermore, multiple beacons on a single side provides redundancy in case one beacon is destroyed or otherwise fails. Even if beacons for an object have multiple serial numbers and are not synchronized, data analysis in most cases will not be confused by the presence of multiple signals, so long as it is known that the serial numbers are associated with the object.

A beacon device should also be autonomous so it may be attached to inert objects such as rocket bodies, it doesn't require resources from a payload, and it keeps working even when the space vehicle doesn't. The beacon should be readable from the ground with relatively modest equipment. The beacon device should also be small, light, cheap, and simple to integrate so it can be used with small, light, and relatively cheap space vehicles. It is also beneficial to have no Radio Frequency Interference (RFI), and to require no signals, commands, or power from the payload.

One possibility is to add a spectroscopy element to a photon counting camera so each point source looks like a streak with longer wavelengths on one end and shorter wavelengths on the other. This can allow the beacon technique to work with light sources that are narrow-band but do not necessarily have a stable, or known, wavelength. For instance, some lasers have temperature coefficients on their output wavelengths so they may fall outside of a narrow filter window if they get too cold or too hot. This permits the use of a wider filter window covering all plausible laser wavelengths during data acquisition, with further background rejection provided by spatial filtering in the later analysis. Another possibility is to manipulate the laser light at the beacon to produce circularly polarized light, and use a circularly polarized filter at the telescope to reject the portion of the background that is of the opposite polarization.

FIG. 3 is a block diagram illustrating a laser beacon 300, according to an embodiment of the present invention. Laser beacon 300 includes a solar cell 310, a pattern generator 320, a pulse driver 330, a laser and diffuser 340, power storage 350, and sensors 360. However, power storage 350 and/or sensors 360 may not be included in some embodiments. Power storage 350 may include, but is not limited to, batteries, capacitors, etc. In embodiments where the laser beacon is implemented using existing space vehicle hardware when a space vehicle is configured for optical communication, the solar cells, power storage, sensors, pattern generator and pulse driver, laser, and/or diffuser of the space vehicle may be used for the beacon.

In some embodiments, laser and diffuser 330 may provide 0.25 mW of radiated optical power and solar cell 310 may be approximately one $cm^2$. To meet wavelength tolerance requirements, it may be desirable to stabilize the laser, either directly in the wavelength regime or by temperature stabilization. The overall size of laser beacon 300 may be approximately 2 cm×2 cm×0.5 cm, and the weight may be only a few grams. For more capabilities, laser beacon 300 may be slightly larger.

Laser beacon 300 may be autonomous and non-interfering, and there may be no on/off switch or "remove before flight." Rather, laser beacon 300 may simply be glued or otherwise attached to a component of a space vehicle, and it will then operate as intended. The small sizes and weights, the lack of on-off switches and remove-before-flight hardware, and the simplicity of merely attaching the laser beacon to the spacecraft of some embodiments rather than integrating it into the spacecraft systems are advantages of the overall system that may facilitate more rapid adoption. Pattern generator 320 and pulse driver 330 contain logic and hardware that enables generation of the desired beacon signal. Pattern generator 320 is a circuit that provides a predetermined or a calculated accurately-timed bit sequence that specifies the serial number and/or other information. Pattern generator 320 can be implemented as a microcontroller, a Field Programmable Gate Array (FPGA), an Application Specific Integrated Circuit (ASIC), or by any other suitable circuitry.

Pulse driver 330 converts the bit sequence into a sequence of brief, high-power pulses suitable for driving the laser of laser and diffuser 340. Additional circuitry, software, or other suitable components may be used to adjust the power level, pulse duration, or other features of the signal in response to the illumination of the spacecraft, the state of the battery charge, the distance to the ground station, or other factors to optimize detectability under operational constraints. The requirements of the pulse generator can be readily achieved by a simple crystal-clocked microcontroller triggering an electrical circuit that produces a brief current pulse. The diffuser of laser and diffuser 340 broadens the angle of the laser.

In embodiments where state-of-health is desired, the inertial measurement unit (IMU) sensor and other internal sensors of sensors 360 may provide detection of impact, discharge, etc. without host input, and even solar cell 310 alone may give the spin rate. This information may be utilized by pattern generator 320 to modify the bit sequence produced by pattern generator 320, making the information available to the receiver. As such, laser beacon 300 may act as a "black box" for a space vehicle or other object. Anomalies may be detected and reported back even if the space vehicle goes silent.

Figure 4A:
FIG. 4A is an image illustrating an optical telescope configured to perform beacon tracking, according to an embodiment of the present invention.

FIG. 4A is an image illustrating an optical telescope 400 configured to perform beacon tracking, according to an embodiment of the present invention. In FIG. 4A, a commercial off-the-shelf (COTS) 14" Celestron™ telescope is shown on a Paramount™ ME tracking mount combined with Los Alamos National Laboratory's Ncam™ photon counting camera. Optical telescope 400 can cover approximately a 1° field to allow greater search coverage in the case where the orbit is not accurately known and simultaneously identify all beacon objects in the field of view (FOV).

Figure 4B:
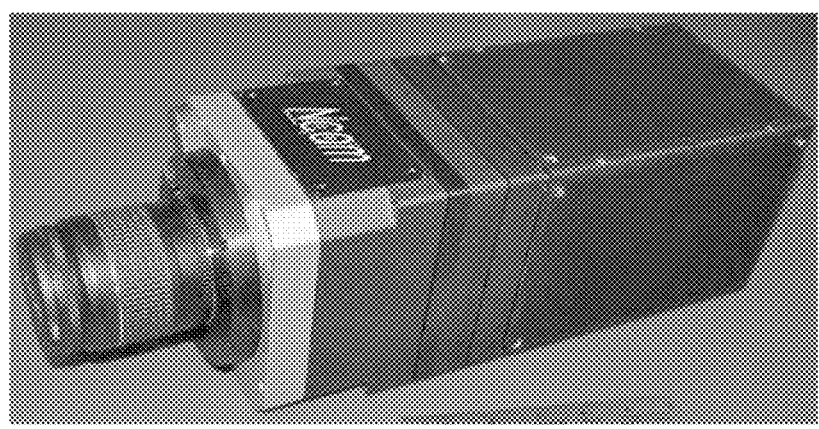
FIG. 4B is an image illustrating a photon counting camera, according to an embodiment of the present invention.

FIG. 4B is an image illustrating the Ncam™ photon counting camera 410 used with optical telescope 400 of FIG. 4A. Ncam™ has a 100 picosecond timing resolution, a 25 mm detector diameter, and is an approximately 100,000 resolution element imaging camera. A 10 GHz equivalent bandwidth allows for a large coding gain.

Figure 5:
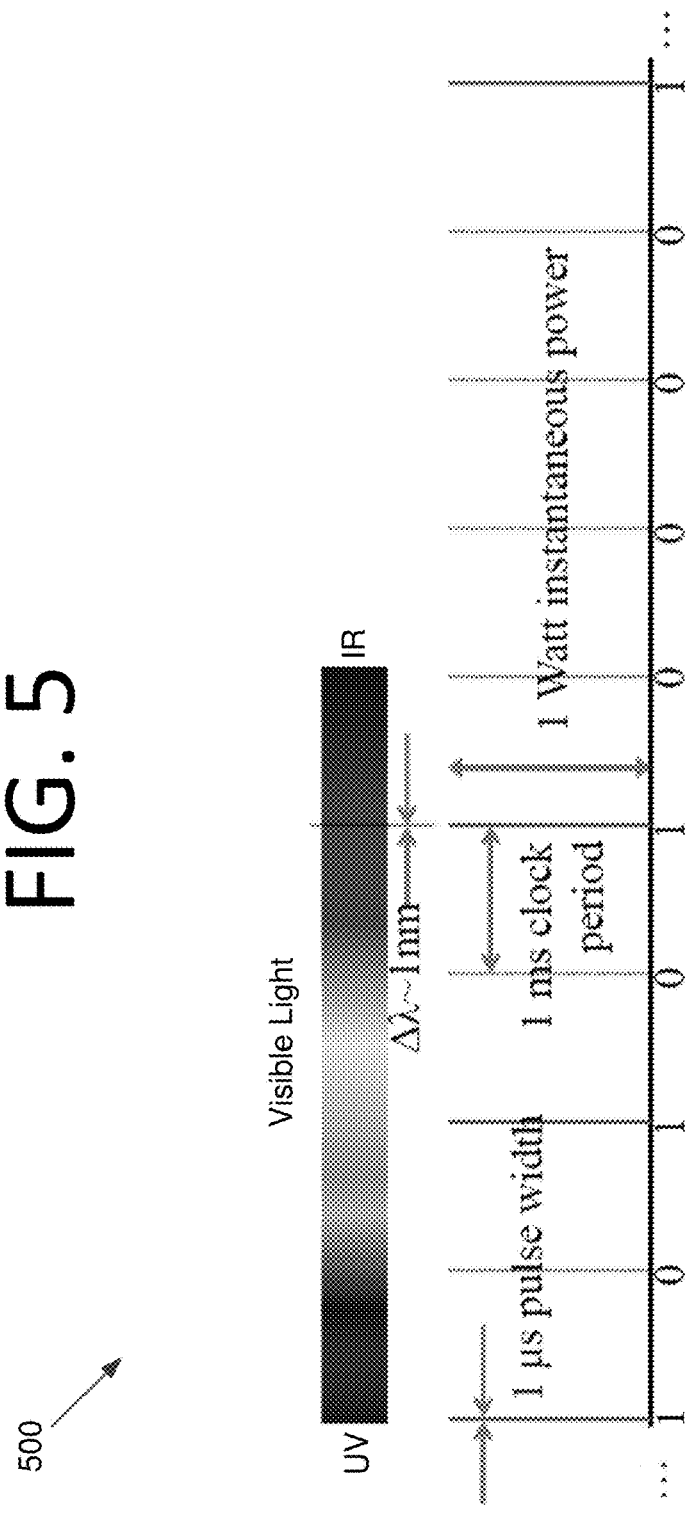
FIG. 5 is a graph illustrating transmission of an optical identifier, according to an embodiment of the present invention.

Per the above, relatively modest optics can robustly identify a specific optical signal with little power by using a narrow wavelength filter and processing gain in some embodiments. 0.25 mW from LEO may be identified in approximately 100 seconds of observation in some embodiments, even on a background of a 1 m² satellite that is painted white in full sunlight. FIG. 5 is a graph 500 illustrating transmission of an optical identifier, according to an embodiment of the present invention. In this example, a 32-of-128 bit error correcting code is transmitted for the identifier (e.g., a serial number), and the bits 1010100001, representing 10 of the repeating 128 bits of the pattern, are shown. The "is" are transmitted as pulses of laser light in the red visible range with a Δλ of approximately 1 nm. However, any desired light or non-light wavelength (e.g., ultraviolet, infrared, etc.) may be used in certain embodiments depending on the laser emitter that is used. Also, while the pulse width is 1 μs, the clock period is 1 ms, and 1 Watt of instantaneous power is used to generate the "1s" here, different pulse widths, clock periods (or aperiodic timing), and/or powers may be used.

Figure 6:
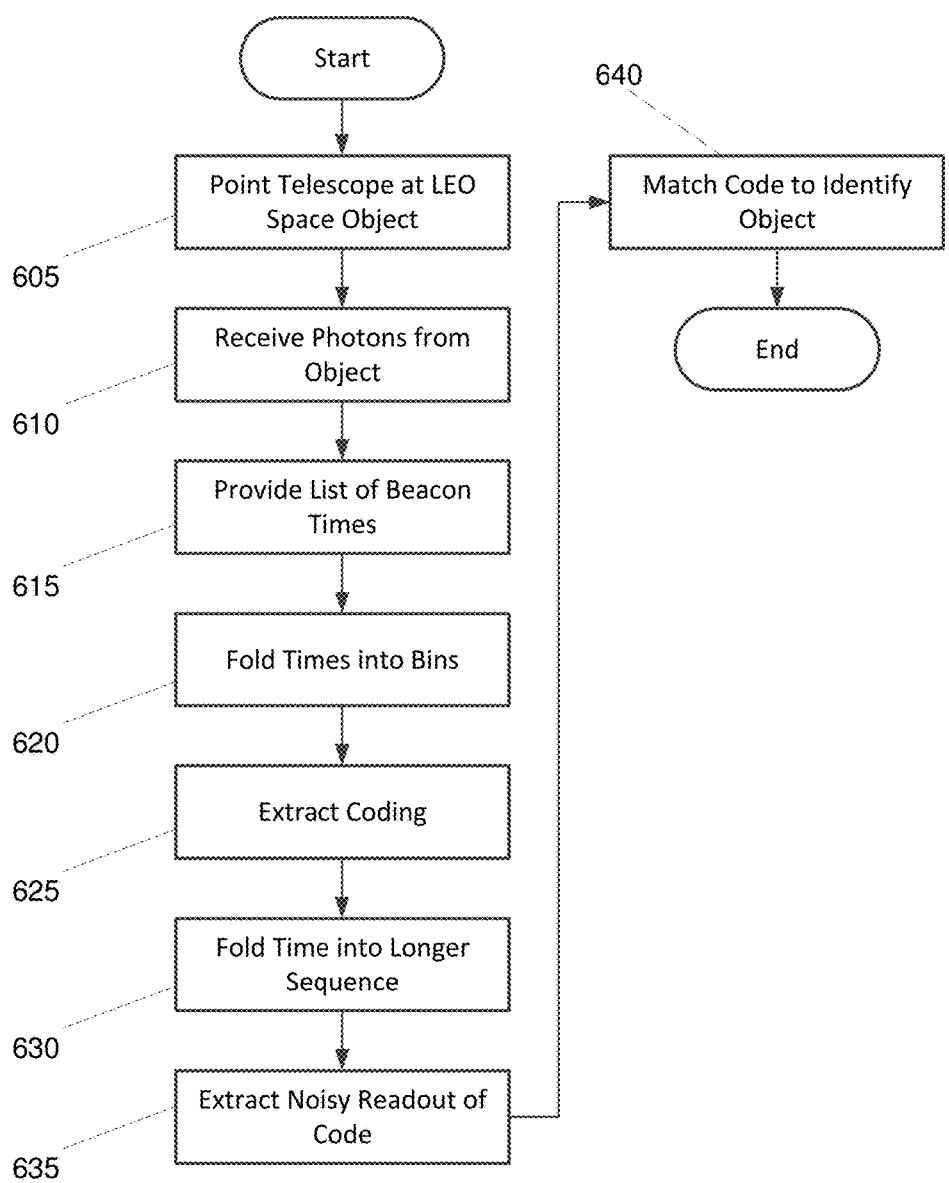
FIG. 6 is a flowchart illustrating a process for data analysis that goes from observed photon times to a space object identification, according to an embodiment of the present invention.

FIG. 6 is a flowchart 600 illustrating an example of a process for data analysis that goes from observed photon times to a space object identification, according to an embodiment of the present invention. In this example, the numbers are round to aid in comprehension, but they are on the conservative side of a typical application. For this example, it is assumed that the standard for beacon communication includes 1 μs pulses with a 1 millisecond bit-time using 25-100 encoding (i.e., every 0.100 seconds, the beacon produces 25 light pulses, each 1 microsecond long, at times exactly 1, 2, 3, or any other suitable number of milliseconds apart).

The possible number of such codes is approximately $2.4 \times 10^{21}$, but only one million are assigned in this example, chosen to be as different from one another as possible. Such codes usually have specific lengths, weights, etc. for mathematical reasons, but for the purpose of illustration, human-friendly numbers are used in this example. These "m-of-n" codes (in this case, m=25 and n=100) have $$\binom{n}{m} = \frac{n!}{m!(n-m)!}$$

potential codewords. Because the starting bit of the code is unknown, codewords cannot be used that are the same as other codewords except for a cyclic shift, reducing the number of available codewords by a factor of n. Even with this restriction, a million codewords can still readily be selected from the 25-100 set, and it is possible to select them such that no two are closer than a Hamming distance of 12. In other words, if a serial number is read, six "1s" need to be misread as "0s" and six "0s" need to be misread as "1s" to match a different serial number.

The process begins with pointing an optical telescope at a space object (e.g., a LEO satellite) at 605 and receiving photons from the space object at 610. The telescope in this example receives 1,000 photons per second from the object, of which 10 per second are in the right wavelength range to be the beacon, and the remaining 990 photons are blocked by a narrow-band filter, such as narrow-band filter 226 of FIG. 2. However, only one photon per second is actually from the beacon. These numbers, which are after adjustments for detector efficiency, etc., are readily achievable with small aperture telescopes in the 8-16" range. The observation is 100 seconds long, so the photodetector gives a list of 1,000 photon times at 615, of which 100 are from the beacon.

The photon times are then "folded" at a 1 ms period into 1,000 bins of 1 μs each at 620. In other words, a histogram of 1,000 bins is set up and if a photon is detected at a time of 12:34:56.789<u>000</u>, it is counted in histogram bin 0. A photon detected about a minute later at 12:36:00.000<u>500</u> is counted in bin 500. However, different bin schemes may be used without deviating from the scope of the invention. Each time is taken, the hours, minutes, seconds, and milliseconds are stripped away, and the number of microseconds is used as the bin number. If the timing is right, there will be one bin with the 100 beacon photons therein, plus approximately one background photon. The other 999 bins will average approximately one photon each. This distribution is statistically impossible (at the $10^{-157}$ level) to occur by chance in the absence of a periodic signal, and indicates a definite detection of the beacon.

Because the goal is identification of an unknown object, the timing is highly unlikely to be correct on the first try. Rather, the timing should be adjusted for the time light takes to travel between the RSO and the observer, which may be calculated from the orbital path of the object. Some constraints may be made on the orbital path based on tracking of the RSO with the telescope, so it may be assumed that the distance error changes by up to 30 km (i.e., 100 light-microseconds) over the course of the observation.

Because the beacons of some embodiments are designed to be cheap, compact, lightweight, and relatively low power, the clock source will likely have an accuracy of around 10 parts per million (i.e., 1,000 µs in the 100 second observation), which is typical for a crystal oscillator. The observer would thus want to try folding at periods that differ by as much as ±1,100 µs/100 s, with 1 µs spacing. The 2,200 different frequency trials may be handled even by computing systems with very low processing power in much less time than the observations take. The relatively large number of trials, and other factors such as the 1,000 potential bins for the peak, only weakens the statistics from the $\sim 10^{-157}$ to the $\sim 10^{-150}$ level, which is still statistically impossible.

Once the timing of the pulses is determined, the coding is extracted at 625. By taking the approximately 100 photons that are in the 1 µs bin of the beacon discussed above, throwing away the ~1,000 photons in the other bins, and folding the time again into 100 bins of 1 ms each at 630, a noisy readout of the code is extracted at 635. For example, if the 1 ms folding found that the beacon was at microsecond 837, then the photon at time 12:36:00.017837 will go in bit 17, 12:36:01.095837 will go in bit 95, and 12:36:00.017123 will be discarded since it is at the wrong microsecond (i.e., 123≠837).

In this example, the typical "1" bit will average 4 photon detections, while only approximately one "0" bit will have a background photon therein. It is likely that several of the "1" bits will be missing (typically 2-3 of the 25 bits that should be "1" will have 1 or fewer photon detections), and perhaps the background counts will make a "0" look like a "1". However, because of the choice of coding discussed above, only one of the million assigned identifier codes will be a good match for the data, and the code is matched to identify the correct object at 640. Even if the object were 1,000 times brighter (i.e., 1,000,000 photons per second into the telescope, 10,000 per second into the laser filter bandpass, and 10 photons per second into a specific microsecond per millisecond), it would take only a small-tuple increase in the beacon power or observation duration to keep the signal timing and coding unambiguous. For a 100 second observation, each bit will have 10 background photons, and each "1" bit will have an additional 4 photons, which is not enough to reliably distinguish the bits with sufficient reliability. However, raising the laser power by a factor of 5 will give the correct best-fit code more than 99.9% of the time.

Regardless of the specification that is adopted, some embodiments use a standardized single wavelength for all beacons so that data may be collected before the RSO is identified. To simplify processing, the pulse timing and coding scheme should also be standardized, although this is less important since the photon timing data can be analyzed against a variety of schemes to determine which scheme was used. Other embodiments may entail the absence of a standardized wavelength, the use of multiple wavelengths, and non-disclosure of the wavelength or wavelengths in use.

In some embodiments, the laser emitter of the laser beacon can transmit additional data between the pulses that encode the serial number, enabling provision of extra data and/or black box functionality. Using Code Division Multiple Access (CDMA)-like techniques, this additional data has very little interference with the primary identification function. For instance, by subdividing the nominal 1 ms clock period discussed above into intervals of approximately 1 µs, each additional laser pulse can encode approximately ten bits of information and each clock period can contain multiple pulses, subject to the overall power budget of the system.

The CDMA codes may be tailored with different bandwidth/redundancy trade-offs so the same observation that receives a serial number might also see a flag indicating that an anomaly was received and more data is on code B. In some embodiments, the flag that indicates the presence of data on channel B can be a low-bandwidth indicator that is easily detected in any observation that also receives the serial number, providing a cue that can motivate more or better observations to recover the Code B signal. Code B may be a high-bandwidth code that requires more resources (e.g., a larger aperture receiver, longer observing time, etc.) to bring it up above the noise floor. The data on this code could contain the details of the anomaly, including data from additional sensors that might be included in the transmitter package or provided from external sources. For example, mechanical shock sensors can trigger, gyros or magnetometers (or even the modulation of the solar cells) could indicate a change in rotation rate, or a small antenna might detect an electrical discharge or that the RFI from the payload has changed character. This timestamped information can allow the determination of what happened and when (debris strike, discharge event, a Single Event Upset (SEU) from a cosmic ray, etc.) without requiring contact with the payload.

Figure 7:
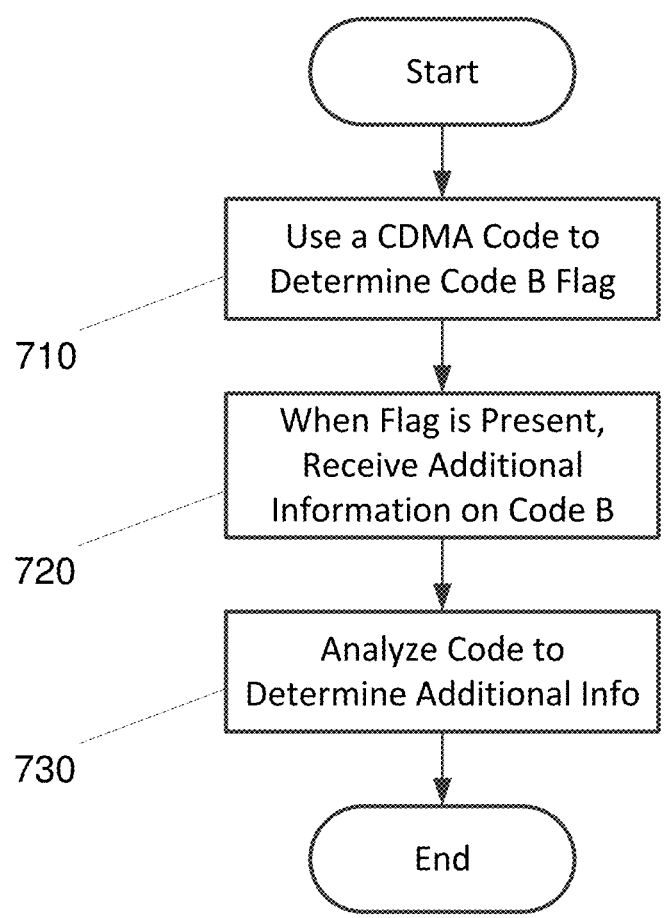
FIG. 7 is a flowchart illustrating a process for providing additional information via a beacon, according to an embodiment of the present invention.

FIG. 7 is a flowchart 700 illustrating a process for providing additional information via a beacon, according to an embodiment of the present invention. The process begins with using a CDMA code to determine whether a Code B flag is present in the beacon signal at 710. Code B is a higher bandwidth code than the beacon code. If the flag is present, additional information is received on Code B at 720 using more resources. The information on Code B is then analyzed at 730 to determine the contents thereof. For instance, the Code B information may include state-of-health information for a space vehicle.

Figure 8:
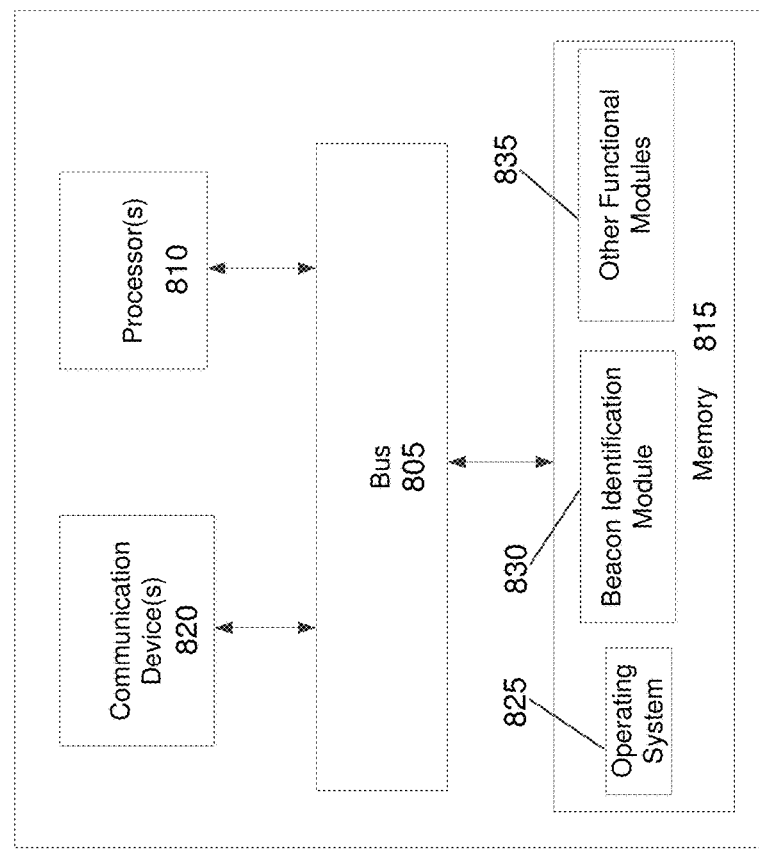
FIG. 8 is a block diagram illustrating a computing system configured to determine beacon identifiers, according to an embodiment of the present invention.

FIG. 8 is a block diagram illustrating a computing system configured to determine beacon identifiers, according to an embodiment of the present invention. Computing system 800 includes a bus 805 or other communication mechanism for communicating information, and processor(s) 810 coupled to bus 805 for processing information. Processor(s) 810 may be any type of general or specific purpose processor, including a central processing unit ("CPU") or application specific integrated circuit ("ASIC"). Processor(s) 810 may also have multiple processing cores, and at least some of the cores may be configured to perform specific functions. Computing system 800 further includes a memory 815 for storing information and instructions to be executed by processor(s) 810. Memory 815 can be comprised of any combination of random access memory (RAM), read only memory (ROM), flash memory, cache, static storage such as a magnetic or optical disk, or any other types of non-transitory computer-readable media or combinations thereof. Additionally, computing system 800 includes one or more communication devices 820, such as a transceiver and antenna configured for satellite communication, wireless communication, and/or wired communication. However, in many embodiments, and in order to reduce cost, communication devices 820 will not be present.

Non-transitory computer-readable media may be any available media that can be accessed by processor(s) 810 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Memory 815 stores software modules that provide functionality when executed by processor(s) 810. In certain embodiments, the software modules may be written in C or any other suitable programming language. The modules include an operating system 825 for computing system 800. The modules further include a beacon identification module 830 that is configured to perform the various beacon identification operations discussed herein, such as identifying beacon signals based on light received from an optical telescope. Computing system 800 may include one or more additional functional modules 835 that provide additional functionality.

It should be noted that some of the computing system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 6 and 7 may be performed by a computer program, encoding instructions for the nonlinear adaptive processor to perform at least the processes described in FIGS. 6 and 7, in accordance with embodiments of the present invention. The computer program may exist, in whole or in part, on multiple computing devices. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 6 and 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

FIG. 9 is an architectural diagram illustrating a ground beacon system 900, according to an embodiment of the present invention. Beacon 930 is worn, attached, etc. to a person, vehicle, object or location of interest, animal (e.g., for wildlife tracking), etc. A photon detector is mounted on a ground-based optical system 910 or an aircraft 920. If optical system 910 is moving in space or angular orientation, this movement can be measured and used to calculate a motion compensation for each photon to project its origin to a point on the ground or other suitable georeference frame. If beacon 930 is in motion relative to that georeference frame, this motion may also be compensated for using the beacon's known motion if available or in multiple analyses covering the range of plausible motions.

Because ground-based motion is often less predictable than that of RSOs in orbit, the system parameters, including the beacon power level and the aperture of the optics, may be adjusted so that the time required to read the beacon signal is much shorter than for the RSO case, typically on the order of one second. Because the ranges of ground-based systems are typically much shorter than for space systems (i.e., kilometers or less instead of hundreds or thousands of kilometers), this can be done without excessive beacon power, allowing a small battery to drive the beacon for many nights and with an amount of light emitted that will not make beacon 930 conspicuous to an observer who is not filtering by laser wavelength or using timing to extract a signal. To further reduce the conspicuousness of the beacon to nearby observers, the light may be spatially spread out to a region that is substantially matched to the angular resolution of optical system 910 or aircraft 920, but presenting a dim, angularly diffuse glow to a nearby observer, allowing beacon 930 to blend in with the natural variations of the surrounding scene. The beacon signal may encode a nonspecific signal, a simple identifier, predetermined messages such as "need medical assistance", free form messages, other data, or any combination thereof.

FIG. 10 is an architectural diagram illustrating an air-to-ground beacon system, according to an embodiment of the present invention. The operation in this case is similar to the case in FIG. 9, although optical system 1010 is likely to require a more sophisticated system to keep an aircraft and its beacon 1020 in its field of view and to compensate for the motion of the aircraft. If the aircraft has navigation lights or anti-collision strobe lights, for example, the beacon signal may be modulated directly into the output of those lights. Alternatively, beacon 1020 may use those lights to simplify the task of recovering the beacon signal (e.g., by synchronizing a modulated laser so that the first bit of its signal occurs at a known time after the start of the strobe flash).

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A beacon device, comprising:
a laser configured to emit laser light;
a pattern generator and pulse driver that are configured to control the laser to emit the laser light in accordance with a pattern of a beacon signal, and
a diffuser configured to diffuse the emitted laser light; and
an optical detection system configured to receive the diffused laser light emitted from the laser beacon, wherein
the beacon signal comprises an m-of-n code unique identifier of the beacon device that is at least a predetermined Hamming distance from any other unique identifier for other beacon devices, and
m is a number of pulses of the emitted laser light that are emitted over a predetermined time period.

2. The beacon device of claim 1, wherein the diffuser is configured to diffuse the emitted laser light with a sufficiently broad angle such that the diffused light reaches a majority or entirety of a visible hemisphere of the Earth for space applications and pointing is rendered moot.

3. The beacon device of claim 1, wherein the pattern generator and pulse driver are configured to include a flag in the beacon signal indicating that additional information is available using a different code, and to cause the laser to emit the additional information.

4. The beacon device of claim 1, wherein the beacon device is also configured to be affixed to or otherwise made proximate to a person, a ground vehicle, and/or an aircraft.

5. The beacon device of claim 1, wherein the optical detection system comprises an optical telescope, the optical telescope comprising:
a dichroic mirror in an optical path of the optical telescope configured to pick off light wavelengths in a range that include a wavelength of the beacon device;
a narrow-band filter configured to block light that is more than a predetermined wavelength from the wavelength of the beacon device; and
a photon-counting camera configured to determine arrival times of photons in the wavelength of the beacon device.

6. The beacon device of claim 5, wherein the photon-counting camera comprises:
an image sensor configured to detect non-laser light; and
a single-photon detector that records times of photon detections.

7. The beacon device of claim 1, wherein the optical detection system comprises a photon detector based on the ground or mounted to an aircraft.

8. The beacon device of claim 1, further comprising a computing system, the computing system comprising:
memory storing computer program code; and
at least one processor configured to execute the computer program code, wherein the computer program code is configured to cause the at least one processor to:
receive a plurality of photon times that were observed over a predetermined period of time,
fold the observed photon times into a plurality of bins,
determine a largest bin that has a largest number of photons,
extract a coding from the largest bin, and
match the coding to a space vehicle, an object, a person, a ground vehicle, or an aircraft.

9. The beacon device of claim 8, wherein the computer program code is further configured to cause the at least one processor to:
determine whether a flag is present in the beacon signal; and
when the flag is present, receive additional information using a second coding method that requires more resources than were required to receive the beacon signal and analyze the additional information to determine its contents.

10. The beacon device of claim 9, wherein the additional information comprises state-of-health information.

11. A beacon device, comprising:
a laser configured to emit laser light;

a pattern generator and pulse driver that are configured to control the laser to emit laser light in accordance with a pattern of a beacon signal; and a diffuser configured to diffuse the emitted laser light, wherein the pattern generator and the pulse driver are also configured to emit a Code B signal at a higher bandwidth than the beacon signal that requires more resources to bring the Code B signal above a noise floor, the Code B signal comprising timestamped anomaly data, the beacon signal comprises an m-of-n code unique identifier of the beacon device that is at least a predetermined Hamming distance from any other unique identifier for other beacon devices, and m is a number of pulses of the emitted laser light that are emitted over a predetermined time period.

12. The beacon device of claim 11, wherein the diffuser is configured to diffuse the emitted laser light with a sufficiently broad angle such that the diffused light reaches a majority or entirety of a visible hemisphere of the Earth for space applications.

13. The beacon device of claim 11, wherein the pattern generator and pulse driver are configured to include a flag in the beacon signal indicating that additional information is available using a different code, and to cause the laser to emit the additional information.

14. An optical detection system, comprising:
a dichroic mirror in an optical path of an optical telescope configured to pick off light wavelengths in a range that include a wavelength of a laser beacon;
a narrow-band filter configured to block light that is more than a predetermined wavelength from the wavelength of the laser beacon;
a photon-counting camera configured to determine arrival times of photons in the wavelength of the laser beacon; and
a computing system, the computing system comprising:
memory storing computer program code, and
at least one processor configured to execute the computer program code, wherein the computer program code is configured to cause the at least one processor to:
determine whether a flag is present in a beacon signal of the laser beacon indicating that information is available in a higher bandwidth Code B signal that requires more resources than to bring the Code B signal above a noise floor, and
when the flag is present, retrieve timestamped anomaly data from the Code B signal, wherein
the beacon signal comprises an m-of-n code unique identifier of a beacon device associated with the beacon signal that is at least a predetermined Hamming distance from any other unique identifier for other beacon devices, and
m is a number of pulses of the laser beacon that are emitted over a predetermined time period.

15. The optical detection system of claim 14, wherein the photon-counting camera comprises:
an image sensor configured to detect non-laser light; and
a single-photon detector that records times of photon detections.

16. The optical detection system of claim 14, wherein the computer program code is also configured to cause the at least one processor to:
receive a plurality of photon times that were observed over a predetermined period of time,
fold the observed photon times into a plurality of bins,
determine a largest bin that has a largest number of photons,
extract a coding from the largest bin, and
match the coding to a space vehicle, an object, a person, a ground vehicle, or an aircraft.

17. The optical detection system of claim 14, wherein the information available in the higher bandwidth Code B signal comprises state-of-health information.

18. The beacon device of claim 1, wherein no two identifiers for beacon devices are closer than a Hamming distance of 12.

19. The beacon device of claim 1, wherein a number of potential unique identifiers for the beacon devices that is suitable for tracking space objects is determined by:

$$\binom{n}{m} = \frac{n!}{m!(n-m)!}$$

where n is a factor that reduces the number of potential unique identifiers to account for an unknown starting bit and to ensure that no two identifiers can be used that are the same except for a cyclic shift.

* * * * *